US012801517B2

(12) United States Patent
Sureshbabu et al.

(10) Patent No.: US 12,801,517 B2
(45) Date of Patent: Nov. 17, 2026

(54) METHOD AND SYSTEM OF DETERMINING TEST PROCEDURES USING LARGE LANGUAGE MODELS

(71) Applicant: L&T TECHNOLOGY SERVICES LIMITED, Tamil Nadu (IN)

(72) Inventors: Niveditha Sureshbabu, Bengaluru (IN); Rajesh Raj, Bengaluru (IN); Madhusudan Singh, Bengaluru (IN)

(73) Assignee: L&T TECHNOLOGY SERVICES LIMITED, Tamil Nadu (IN)

( * ) Notice: Subject to any disclaimer, the term of this patent is extended or adjusted under 35 U.S.C. 154(b) by 321 days.

(21) Appl. No.: 18/748,205

(22) Filed: Jun. 20, 2024

(65) Prior Publication Data

US 2025/0321874 A1 Oct. 16, 2025

(30) Foreign Application Priority Data

Apr. 12, 2024 (IN) ............................. 202441030121

(51) Int. Cl.
*G06F 11/3668* (2025.01)

(52) U.S. Cl.
CPC ................................ *G06F 11/3696* (2013.01)

(58) Field of Classification Search
None
See application file for complete search history.

(56) References Cited

U.S. PATENT DOCUMENTS 12,524,214 B1 * 1/2026 Liguori ................... G06F 8/425
2023/0259705 A1 8/2023 Tunstall-Pedoe et al.
2024/0281600 A1 * 8/2024 Brown ....................... G06F 8/30
2024/0311272 A1 * 9/2024 Schaefer ............. G06F 11/3604
2024/0311582 A1 * 9/2024 Schaefer .................. G06N 3/08
2025/0045150 A1 * 2/2025 Agrawal ............. G06F 11/3684
2025/0077396 A1 * 3/2025 Sen ..................... G06F 11/3684
2025/0077397 A1 * 3/2025 Sen ..................... G06F 11/3684
(Continued)

OTHER PUBLICATIONS

A. Mathur, S. Pradhan, P. Soni, D. Patel and R. Regunathan, “Automated Test Case Generation Using T5 and GPT-3,” 2023 9th International Conference on Advanced Computing and Communication Systems (ICACCS), Coimbatore, India, 2023, pp. 1986-1992. (Year: 2023).*
(Continued)

*Primary Examiner* — Andrew M. Lyons
(74) *Attorney, Agent, or Firm* — Kendal M. Sheets

(57) ABSTRACT

A method and system of determining test procedures using large language models (LLMs) is disclosed. A processor receives a plurality of domain-based documents corresponding to a test product to be tested. One or more user requirements are determined corresponding to at least one feature of the test product from one of the plurality of domain-based documents. A plurality of domain-specific keywords is determined from the one or more user requirements. A contextual data is determined by extracting a portion of a text data from the plurality of domain-based documents. A knowledge dataset is determined by prompting a second LLM based on a second prompt and the contextual data. One or more test procedures for one or more test cases for testing the at least one feature of the test product by prompting a third LLM based on a third prompt and the knowledge dataset.

18 Claims, 3 Drawing Sheets

(56) References Cited

U.S. PATENT DOCUMENTS

| | | | | |
|---|---|---|---|---|
| 2025/0077400 | A1* | 3/2025 | Sen | G06F 11/3684 |
| 2025/0085934 | A1* | 3/2025 | Kunz | G06F 11/3604 |
| 2025/0130928 | A1* | 4/2025 | Hecking-Harbusch | G06F 11/3688 |
| 2025/0156288 | A1* | 5/2025 | Kakarla | G06F 11/28 |
| 2025/0217269 | A1* | 7/2025 | Rihani | G06F 11/3466 |
| 2025/0238352 | A1* | 7/2025 | Yogesha | G06F 11/3684 |
| 2025/0265179 | A1* | 8/2025 | Kanagovi | G06F 11/3684 |
| 2025/0298587 | A1* | 9/2025 | Carrara | G05B 19/0426 |
| 2025/0298721 | A1* | 9/2025 | Berg | G06F 11/362 |
| 2025/0307121 | A1* | 10/2025 | Desai | G06F 11/3684 |

OTHER PUBLICATIONS

T. Rahman and Y. Zhu, "Automated User Story Generation with Test Case Specification Using Large Language Model," arXiv:2404.01558v1, Apr. 2, 2024, 10 pp. (Year: 2024).*

Lance Martin; Auto-Eval of Question-Answering Tasks; Apr. 15, 2023; https://blog.langchain.dev/auto-eval-of-question-answering-tasks/.

Sohini Roychowdhury; Journey of Hallucination-minimized Generative AI Solutions for Financial Decision Makers; ACM International Conference on Web Search and Data Mining, 2024; Nov. 18, 2023; arXiv:2311.1096; Association for Computing Machinery.

* cited by examiner

METHOD AND SYSTEM OF DETERMINING TEST PROCEDURES USING LARGE LANGUAGE MODELS

TECHNICAL FIELD

This disclosure relates generally to content generation and more particularly to a method and system of determining content generation using Large Language Models (LLMs).

BACKGROUND

Testing is critical process when it comes to development of new software, electrical component, electronics components, etc. The current testing processes rely heavily on manual generation of test cases and test procedures. In order to create test cases and test procedures, testers are required to have sufficient domain-knowledge to test all necessary features of a product. This manual approach may consume significant time in creation of the test cases. Also, lack of sufficient domain knowledge may lead to creation of non-exhaustive test cases and procedures. Automation in testing also fails to provide an efficient solution to create exhaustive test cases and test procedure to test all the technical features of a product due to lack of domain knowledge.

Therefore, there is a requirement for an efficient and effective methodology for determining test procedures based on domain knowledge.

SUMMARY OF THE INVENTION

In an embodiment, a method for determining test procedures using large language models (LLMs) is disclosed. The method may include receiving, by a processor, a plurality of domain-based documents corresponding to a test product to be tested. The method may further include determining, by the processor, one or more user requirements corresponding to at least one feature of the test product from one of the plurality of domain-based documents. The method may further include determining, by the processor, a plurality of domain-specific keywords from the one or more user requirements by prompting a first LLM based on a first prompt. The method may further include determining, by the processor, contextual data by extracting a portion of text data from the plurality of domain-based documents. In an embodiment, the portion of the text data may include one or more of the plurality of domain-specific keywords. The method may further include determining by the processor, a knowledge dataset by prompting a second LLM based on a second prompt and the contextual data. In an embodiment, the knowledge dataset may include a set of questions and a set of answers to each of the set of questions based on the contextual data and the text data of the plurality of domain-based documents. In an embodiment, the second prompt may be engineered to prompt the second LLM to list the set of questions and the set of answers to each of the set of questions based on the contextual data and the text data of the plurality of domain-based documents. The method may further include determining, by the processor, one or more test procedures for one or more test cases for testing the at least one feature of the test product by prompting a third LLM based on a third prompt and the knowledge dataset. In an embodiment, the third prompt may include the one or more test cases for testing the at least one feature of the test product.

In another embodiment, a system of determining test procedures based on large language models (LLMs) is disclosed. The system may include a processor, a memory communicably coupled to the processor, wherein the memory may store processor-executable instructions, which when executed by the processor may cause the processor to receive a plurality of domain-based documents corresponding to a test product to be tested. The processor may further determine one or more user requirements corresponding to at least one feature of the test product from one of the plurality of domain-based documents. The processor may further determine a plurality of domain-specific keywords from the one or more user requirements by prompting a first LLM based on a first prompt. The processor may further determine a contextual data by extracting a portion of text data from the plurality of domain-based documents. In an embodiment, the portion of the text data may include one or more of the plurality of domain-specific keywords. The processor may further determine a knowledge dataset by prompting a second LLM based on a second prompt and the contextual data. In an embodiment, the knowledge dataset may include a set of questions and a set of answers to each of the set of questions based on the contextual data and the text data of the plurality of domain-based documents. In an embodiment, the second prompt may be engineered to prompt the second LLM to list the set of questions and the set of answers to each of the set of questions based on the contextual data and the text data of the plurality of domain-based documents. The processor may further determine one or more test procedures for one or more test cases for testing the at least one feature of the test product by prompting a third LLM based on a third prompt and the knowledge dataset. In an embodiment, the third prompt may include the one or more test cases for testing the at least one feature of the test product.

It is to be understood that both the foregoing general description and the following detailed descriptions are exemplary and explanatory only and are not restrictive of the invention, as claimed.

DETAILED DESCRIPTION OF THE DRAWINGS

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered exemplary only, with the true scope being indicated by the following claims. Additional illustrative embodiments are listed.

Further, the phrases "in some embodiments", "in accordance with some embodiments", "in the embodiments shown", "in other embodiments", and the like mean a particular feature, structure, or characteristic following the phrase is included in at least one embodiment of the present disclosure and may be included in more than one embodiment. In addition, such phrases do not necessarily refer to the same embodiments or different embodiments. It is intended that the following detailed description be considered exemplary only, with the true scope being indicated by the following claims.

Large Language Models (LLMs) are being leveraged for performing various authoring tasks due to their text generation capacity. However, due to poor prompting language sometimes LLMs provide irrelevant and incorrect output. Further, LLMs may also rely on the generic training data that may not be sufficient to be able for them to provide output related to niche domains of the test product.

In order to automate the test case creation process, LLMs may be required to be trained up to a level of a domain expert. Such training necessitates the infusion of domain and external knowledge. The present disclosure provides a system and a method of determining test procedures using LLMs.

Figure 1:
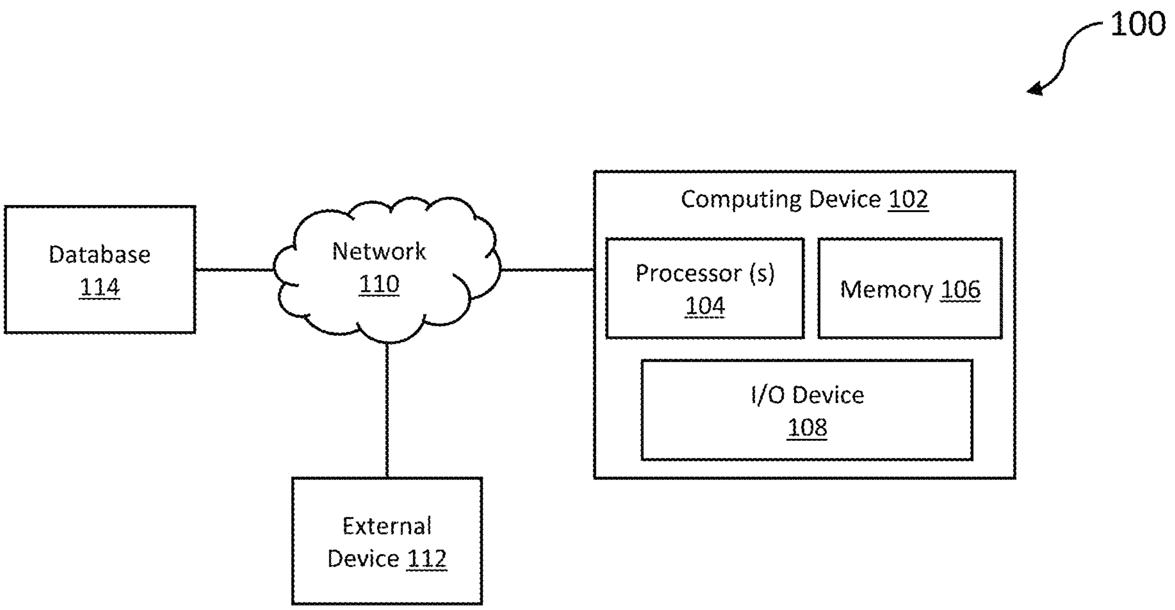
FIG. 1 illustrates a block diagram of an exemplary test procedures determination system for determining test procedures using large language models, in accordance with an embodiment of the present disclosure.

Referring now to FIG. 1, a block diagram of an exemplary test procedures determination system 100 is illustrated, in accordance with an embodiment of the present disclosure. The test procedure determination system 100 may include a computing device 102, an external device 112, and a database 114 communicably coupled to each other through a wired or wireless communication network 110. The computing device 102 may include a processor 104, a memory 106 and an input/output (I/O) device 108.

In an embodiment, examples of processor(s) 104 may include, but are not limited to, an Intel® Itanium® or Itanium 2 processor(s), or AMD® Opteron® or Athlon MP® processor(s), Motorola® lines of processors, Nvidia®, FortiSOC™ system on a chip processors or other future processors.

In an embodiment, the memory 106 may store instructions that, when executed by the processor 104, may cause the processor 104 to determine test procedures using a plurality of LLMs, as discussed in more detail below. In an embodiment, the memory 106 may be a non-volatile memory or a volatile memory. Examples of non-volatile memory may include but are not limited to, a flash memory, a Read Only Memory (ROM), a Programmable ROM (PROM), Erasable PROM (EPROM), and Electrically EPROM (EEPROM) memory. Further, examples of volatile memory may include but are not limited to, Dynamic Random Access Memory (DRAM), and Static Random-Access memory (SRAM).

In an embodiment, the I/O device 108 may comprise of variety of interface(s), for example, interfaces for data input and output devices, and the like. The I/O device 108 may facilitate inputting of instructions by a user communicating with the computing device 102. In an embodiment, the I/O device 108 may be wirelessly connected to the computing device 102 through wireless network interfaces such as Bluetooth®, infrared, or any other wireless radio communication known in the art. In an embodiment, the I/O device 108 may be connected to a communication pathway for one or more components of the computing device 102 to facilitate the transmission of inputted instructions and output results of data generated by various components such as, but not limited to, the processor(s) 104 and data saved in the memory 106.

In an embodiment, the database 114 may be enabled in a cloud or a physical database and may store a plurality of domain-based documents, knowledge dataset, and contextual data. In an embodiment, the database 114 may store data input by an external device 112 or output generated by the computing device 102. In an embodiment, the domain-based documents may include domain based technical information related to a test product to be tested. In an exemplary embodiment, the domain-based documents may include architecture, specifications, CAN matrix and so on in case of an electrical test product.

In an embodiment, the communication network 110 may be a wired or a wireless network or a combination thereof. The network 110 can be implemented as one of the different types of networks, such as but not limited to, ethernet IP network, intranet, local area network (LAN), wide area network (WAN), the internet, Wi-Fi, LTE network, CDMA network, 5G and the like. Further, network 110 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further network 110 can include a variety of network devices, including routers, bridges, servers, computing devices, storage devices, and the like.

In an embodiment, the computing device 102 may receive a request to determine test procedures using Large Language Models (LLMs) from an external device 112 through the network 110. In an embodiment, the computing device 102 and the external device 112 may be a computing system, including but not limited to, a smart phone, a laptop computer, a desktop computer, a notebook, a workstation, a portable computer, a handheld, or a mobile device. In an embodiment, the computing device 102 may be, but not limited to, in-built into the external device 112 or may be a standalone computing device.

In an embodiment, the computing device 102 may perform various processing in order to determine test procedures using LLMs. In an embodiment, examples of the LLMs may include, but are not limited to, zephyr, code LLAMA, GPT, etc. By way of an example, the computing device 102 may receive a plurality of domain-based documents corresponding to a test product to be tested from a user via an I/O device 108. In an embodiment, the plurality of domain-based documents corresponding to the test product to be tested may be stored in the database 114. In an embodiment, the plurality of domain-based documents may include a documents including one or more user requirements.

Accordingly, the computing device 102 may determine one or more user requirements corresponding to at least one feature of the test product from one of the plurality of domain-based documents. The computing device 102 may determine a plurality of domain-specific keywords from the one or more user requirements by prompting a first LLM using a first prompt. In an embodiment, the first prompt may be engineered to prompt the first LLM to output the plurality of domain-specific keywords by determining a set of nouns based on the one or more user requirements corresponding to the test product to be tested.

Further, the computing device 102 may determine contextual data by extracting a portion of text data from the plurality of domain-based documents. In an embodiment, the portion of the text data may include one or more of the plurality of domain-specific keywords. Further, in an embodiment, the contextual data may be determined based on determination of a positional relation between each of the plurality of domain-specific keywords with the text data. In an embodiment, the positional relation may be determined based on a lookup of each of the plurality of domain-specific keywords in the text data of the plurality of domain-specific documents.

Further, the computing device 102 may determine a knowledge dataset by prompting a second LLM using a second prompt and the contextual data. In an embodiment, the knowledge dataset may include a set of questions and a set of answers to each of the set of questions based on the contextual data and the text data of the plurality of domain-based documents. In an embodiment, the second prompt may be engineered to prompt the second LLM to list the set of questions and the set of answers to each of the set of questions based on the contextual data and the text data of the plurality of domain-based documents.

Further, the computing device 102 may determine one or more test cases for testing the at least one feature of the test product by prompting a fourth LLM using a fourth prompt. In an embodiment, the fourth prompt may be engineered to prompt the fourth LLM to list the one or more test cases corresponding to the one or more user requirements. In an embodiment, the test cases may correspond to various scenarios to at least one user requirement to be tested corresponding to the at least one feature of the test product.

Further, the computing device 102 may determine one or more test procedures for each of the one or more test cases for testing the at least one feature of the test product by prompting a third LLM using a third prompt and the knowledge dataset. In an embodiment, the third prompt may include the one or more test cases for testing the at least one feature of the test product. In an embodiment, each of the one or more test procedures may include at least one pre-condition, a set action steps to be performed for testing the test product, and at least one expected outcome for the at least one pre-condition.

In an embodiment, the third prompt may be determined as an output generated by the fourth LLM queried using the fourth prompt. Accordingly, the one or more test cases corresponding to the one or more user requirements may be listed by the fourth LLM as output. In an embodiment, the third prompt may be engineered to output the one or more test procedures for the one or more test cases based on the knowledge dataset and the one or more user requirements. In an embodiment, the third prompt may be engineered to prompt the third LLM to output the one or more test procedures for the one or more test cases based on the knowledge dataset and the one or more user requirements.

Figure 2:
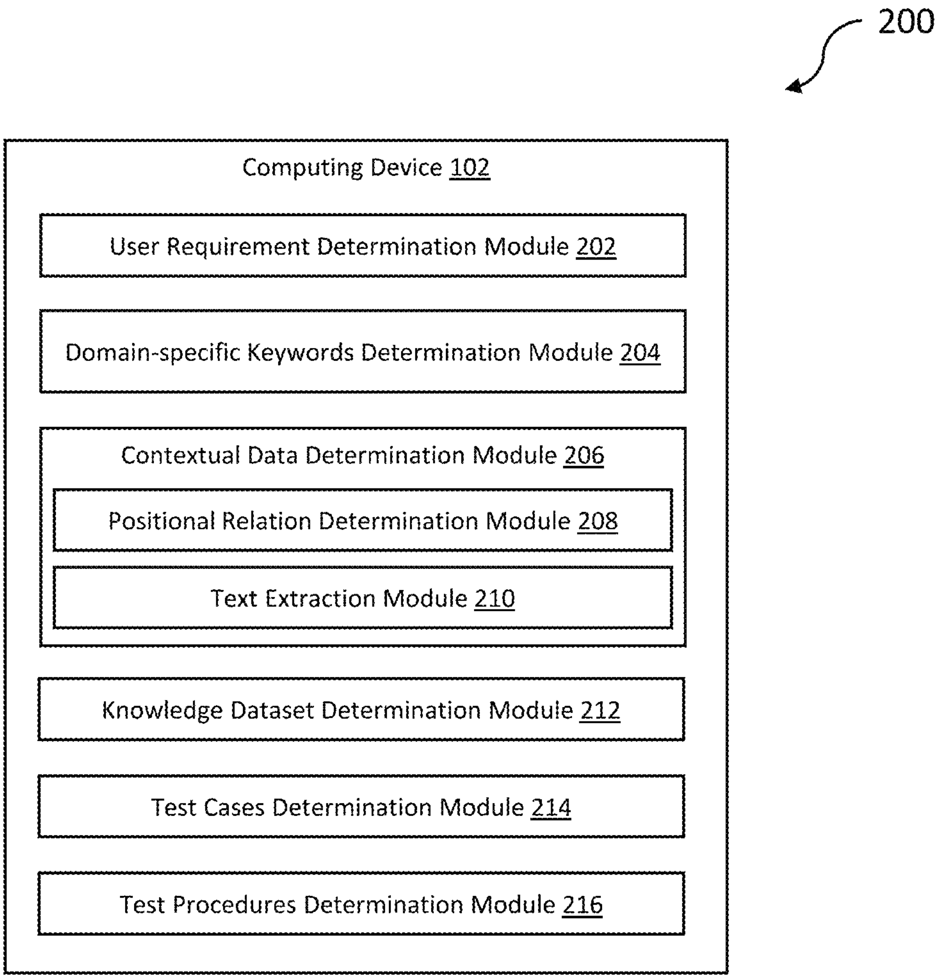
FIG. 2 illustrates a functional block diagram of a computing device, in accordance with an embodiment of the present disclosure.

Referring now to FIG. 2, a functional block diagram of the computing device 102 is illustrated, in accordance with an embodiment of the present disclosure. In an embodiment, the computing device 102 may receive a plurality of domain-based documents corresponding to a test product to be tested.

In an embodiment, the computing device 102 may include a user requirement determination module 202, a domain-specific keywords determination module 204, a contextual data determination module 206, a knowledge dataset determination module 212, a test cases determination module 214, a test procedures determination module 216.

The user requirement determination module 202 may determine one or more user requirements corresponding to at least one feature of the test product from one of the plurality of domain-based documents. In an embodiment, the domain-based documents may include domain based technical information related to a test product to be tested. In an exemplary embodiment, the domain-based documents may include architecture, specifications, CAN matrix and so on in case of an electrical test product.

In an embodiment, one of the plurality of domain-based documents may include a user requirement document. In an embodiment, the user requirement document may include one or more user requirements for testing at least one feature of the test product. According to an exemplary embodiment, an exemplary user requirement document may list one or more user requirements to test one or more features of a test product:

"1. The vehicle inlet power contacts (SAE J1772) shall be electrically isolated from the battery to avoid electric shock when the connector is removed from the vehicle inlet and detection of the proximity pin disconnection.
2. Communication and connection between OBEVC Charger and the Grid follow the SAEJ1772 connector standard.
3. When the LV battery is fully charged to 14.1V then, OBEVC shall:
   a) cut-off the power supply to the LV battery
   b) stop charging LV Battery
   c) Blue LED to be turned OFF
   And when the LV battery voltage drops from 14.1V to 12V, OBEVC shall restart the charging of the LV Battery with blue LED blinking at the rate of 2 sec"

The domain-specific keywords determination module 204 may determine a plurality of domain-specific keywords from the one or more user requirements by prompting a first LLM using a first prompt. In an embodiment, the first prompt may be engineered to prompt the first LLM to output the plurality of domain-specific keywords by determining a set of nouns based on the one or more user requirements corresponding to the test product to be tested. In an embodiment, the set of domain-specific keywords may be but is not limited to nouns related to any device, component, and functionality, etc. corresponding to the product to be tested. In an embodiment, the domain-specific keywords determination module 204 may engineer the first prompt input to the first LLM such that the first LLM may output the plurality of domain-specific keywords in a predefined format. Further, the domain-specific keywords determination module 204 may use a regex checker to list the plurality of domain-specific keywords in a predefined format. In an embodiment, the predefined format may include listing the plurality of domain-specific keywords between square brackets with each keyword separated by a comma. In an embodiment, the first LLM may utilize techniques such as, but not limited to, explainable knowledge ingestion techniques to generate the domain-specific keywords using the domain specific information. In an embodiment, the first prompt may be engineered such that the first LLM may produce results depicting a reasoning behind its decision-making in generating the plurality of domain-specific keywords in accordance with the explainable knowledge ingestion techniques.

According to the exemplary embodiment, the domain-specific keywords determination module 204 may determine the set of domain-specific keywords from the one or more user requirements such as "The vehicle inlet power contacts (SAE J1772) shall be electrically isolated from the battery to avoid electric shock when the connector is removed from the vehicle inlet and detection of the proximity pin disconnection." as "[vehicle, inlet, power, contacts, SAE J1772, battery, electric shock, connector, detection, proximity pin disconnection]."

The contextual data determination module 206 may sub-include a positional relation determination module 208, and a text extraction module 210. The positional relation determination module 208 may determine a positional relation between each of the plurality of domain-specific keywords with a portion of text data. In an embodiment, the positional relation may be determined based on a lookup of each of the plurality of domain-specific keywords in the text data of the plurality of domain-specific documents. Accordingly, the contextual data determination module 206 may determine the contextual data based on the positional relation between each of the plurality of domain-specific keywords with the text data. Further, the text extraction module 210 may extract the portion of the text data from the plurality of domain-based documents including one or more of the plurality of domain-specific keywords. The contextual data determination module 206 may determine the contextual data based on the extraction of the portion of the text data.

In accordance with the exemplary embodiment, the positional relation determination module 208 may determine the positional relation between each of the plurality of domain-specific keywords with a portion of text data present in the plurality of domain-specific documents. For example, the plurality of domain-specific documents may include a requirement document, an architecture document, and a matrix file. In accordance with the exemplary embodiment, the positional relation may be determined based on the lookup of the domain-specific keyword "SAE J1772" in the text data of each of the plurality of domain-specific documents.

Accordingly, in accordance with the exemplary embodiment, the portion of text data in each of the plurality of domain-based documents in which the domain-specific keyword "SAE J1772" is found or looked-up may include various paragraphs from each of the plurality of domain-based documents.

Accordingly, the text extraction module 210 may extract the plurality of paragraphs as portions of the text data that may include one or more of the plurality of domain-specific keywords. In an embodiment, the portions of the text data extracted by the text extraction module 210 may be in form of a predefined second format including, paragraph, a table, or listed points, etc. Accordingly, in accordance with the exemplary embodiment, the portion of text data extracted from each of the plurality of domain-based documents by the text extraction module 210 that may include the domain-specific keyword "SAE J1772" may include the following exemplary paragraphs:

"Usage of SAE J1772 connector as an interface between AC grid (EVSE) and the OBEVC (On-board EV Charger)."

"Communication and connection between OBVEC Charger and the Grid follow the SAE J1772 connector standard."

"The SAE J1772 connector majorly consists of 5 pins for handling the operation. Grid Line Voltage, Grid Neutral, Ground, Control Pilot, Proximity Detection."

"SAE J1772 stands for society of Automotive Engineers standard J1772."

The knowledge dataset determination module 212 may determine a knowledge dataset by prompting a second LLM using a second prompt and the contextual data. In an embodiment, the knowledge dataset may include a set of questions and a set of answers to each of the set of questions based on the contextual data and the text data of the plurality of domain-based documents. In an embodiment, the second prompt may be engineered to prompt the second LLM to list the set of questions and the set of answers to each of the set of questions based on the contextual data and the text data of the plurality of domain-based documents. In an embodiment, the second LLM may utilize techniques such as, but not limited to, explainable knowledge ingestion techniques to generate the list of the set of questions and the set of answers to each of the set of questions using the domain specific information. In an embodiment, the second prompt may be engineered such that the second LLM may produce results depicting a reasoning behind its decision-making in generating the set of questions and the set of answers to each of the set of questions in accordance with the explainable knowledge ingestion techniques.

The knowledge dataset determination module 212 may determine the knowledge dataset that may include the set of questions and the set of answers to each of the set of questions by prompting the second LLM using the second prompt. In an embodiment, the second prompt may be engineered to prompt the second LLM to output at least a predefined number of questions and answers to each of the predefined number of questions in detail from each of the plurality of domain-specific documents for each line or paragraphs of the text data extracted by the text extraction module 210.

In accordance with the exemplary embodiment, for examples, the second prompt input to the second LLM may include, but is not limited to, "generate at least 2 questions and describe the answer in detail from the document based on the text of each line [path of contextual data]". Accordingly, the knowledge dataset determination module 212 may determine the set of questions and answers to each of the set of questions in detail based on the text data of the plurality of domain specific documents.

According to the exemplary embodiment, the set of questions and answer corresponding to each of the set of questions determined based on the contextual data may include, but is not limited to, the following:

"Q1. What is the purpose of using the SAE J1772 connector in the project?

Answer: The SAE J1772 connector is used as an interface between the AC grid (EVSE) and the OBEVC (On-board EV Charger) to provide charge to the HV battery and LV battery and to supply power to auxiliary loads."

"Q2. What is the purpose of the SAE J1772 connector in the On-board EV Charger system?

Answer: The SAE J1772 connector is used as an interface between the AC grid (EVSE) and the OBVEC in the On-board EV Charger system."

The test cases determination module 214 may determine one or more test cases for testing the at least one feature of the test product by prompting a fourth LLM using a fourth prompt based on the one or more user requirements and the knowledge dataset. In an embodiment, the fourth prompt may be engineered to prompt the fourth LLM to list the one or more test cases corresponding to the one or more user requirements. In an embodiment, the fourth LLM may utilize techniques such as, but not limited to, explainable knowledge ingestion techniques to generate the list of the one or more test cases using the domain specific information. In an embodiment, the fourth prompt may be engineered such that the fourth LLM may produce results depicting a reasoning behind its decision-making in generating the list of one or more test cases in accordance with the explainable knowledge ingestion techniques.

In accordance with the exemplary embodiment, one of the user requirements include:

"When the LV battery is fully charged to 14.1V then, OBEVC shall:

a) Cut-off the power supply to the LV battery.
b) Stop charging LV battery.
c) Blue LED to be turned OFF and when the LV battery voltage drops from 14.1V to 12V, OBVEC shall restart the charging of the LV battery with blue LED blinking at the rate of 2 sec."

Accordingly, the fourth prompt as per the exemplary embodiment may be engineered to include, but is not limited to, as follows:

"1. Understand the requirement and identify the key components that need to be tested.
2. Identify the scenario that needs to be tested based on the requirements.
3. Create a test case title that clearly describes the scenario being tested and the expected outcome.
4. Review and refine the test case title to ensure that it accurately reflects the requirement and the scenario being tested. Test case should start with verify word."

Further, the test cases determination module 214 may determine the one or more test cases for prompting the fourth LLM using the fourth prompt. According to the exemplary embodiment, one or more test cases determined by the fourth LLM may include, but is not limited to, as follows:

"1. Verify that OBEVC cuts off the power supply to the LV battery when the LV battery is fully charged to 14.1V.
2. Verify that OBEVC restarts charging LV battery when voltage drops from 14.1V to 12V and blue LED blinks at the rate of 2 sec."

The test procedures determination module 216 may determine one or more test procedures for the one or more test cases for testing the at least one feature of the test product. The one or more test procedures for the one or more test cases may be determined by prompting a third LLM using a third prompt and the knowledge dataset. In an embodiment, each of the one or more test procedures may include at least one pre-condition, a set action steps to be performed for testing the test product, and at least one expected outcome for the at least one pre-condition.

In an embodiment, the third prompt may include the one or more test cases for testing the at least one feature of the test product. In an embodiment, the third prompt may be determined as an output generated by the fourth LLM queried using the fourth prompt. In an embodiment, the third prompt may be engineered to prompt the third LLM to output the one or more test procedures. In an embodiment, the third prompt may be engineered to output the one or more test procedures for the one or more test cases based on the knowledge dataset and the one or more user requirements. In an embodiment, the third LLM may utilize techniques such as, but not limited to, explainable knowledge ingestion techniques to output the one or more test procedures for the one or more test cases using the domain specific information. In an embodiment, the third prompt may be engineered such that the third LLM may produce results depicting a reasoning behind its decision-making in determining the one or more test procedures for the one or more test cases in accordance with the explainable knowledge ingestion techniques.

In accordance with the exemplary embodiment, example of the third prompt may include, but is not limited to, as follows:

"Generate the test procedure provide a one-shot example:
Test procedure containing:

1. Precondition/Test set up.
2. Test Procedure.
3. Expected result.

Similarly to the example provided generate the result."

The test procedures determination module 216 may determine the one or more test procedures for the one or more test cases by prompting the third LLM using the third prompt. According to the exemplary embodiment, the third prompt may include the one or more test cases. According to the exemplary embodiment, the one or more test procedure determined by the third LLM based on the third prompt may include, but are not limited to, as follows:

"Pre-Condition

1. Follow steps mentioned in "Flashing Procedure" file.
2. Execute test case Auto_I-00347-01-01_SysQTP_217 to check error/anomaly status before starting this particular test case.
3. Send LV Battery voltage command with 13.5V for charging LV battery to the required voltage. (Message ID: 0*100, Byte0:0*35, Byte0:0*4C)
4. Send LV Battery current command with 20A for charging LV battery to the required current. (Message ID: 0*99, Byte0:0*01, Byte0:0*14)

Test Procedure

1. Connect the LV battery to the OBEVC.
2. Verify LV battery voltage command with 14.1 V for fully charging the LV battery. (Message ID: 0*100, Byte0:0*32, Byte0:0*85)
3. Monitor the charging process until the LV battery is fully charged to 14.1V.
4. Verify that OBEVC cuts off the power supply to the LV battery when the LV battery is fully charged to 14.1V.
5. Measure voltage at LV O/P port with a multi-meter to ensure that the LV battery voltage is 14.1V.
6. Verify that Blue LED is turned off after the power supply is cut off to the LV battery.

Expected Results

1. LV battery voltage should be 14.1V (Message ID: 0*100, Byte0:0*32, Byte0:0*85).
2. OBVEC should cut off the power supply to the LV battery when the LV battery is fully charged to 14.1V.
3. LV battery is not in charging state. Blue LED should be turned off."

Accordingly, the test procedure may be used for testing the test product for the pre-condition. The expected output of the test case may be verified by determining success or failure of the expected results of the test procedure for the corresponding test case.

It should be noted that all such aforementioned modules 202-216 may be represented as a single module or a combination of different modules. Further, as will be appreciated by those skilled in the art, each of the modules 202-216 may reside, in whole or in parts, on one device or multiple devices in communication with each other. In some embodiments, each of the modules 202-216 may be implemented as dedicated hardware circuit comprising custom application-specific integrated circuit (ASIC) or gate arrays, off-the-shelf semiconductors such as logic chips, transistors, or other discrete components. Each of the modules 202-216 may also be implemented in a programmable hardware device such as a field programmable gate array (FPGA), programmable array logic, programmable logic device, and so forth. Alternatively, each of the modules 202-216 may be implemented in software for execution by various types of processors (e.g. processor 104). An identified module of executable code may, for instance, include one or more physical or logical blocks of computer instructions, which may, for instance, be organized as an object, procedure, function, or other construct. Nevertheless, the executables of an identified module or component need not be physically located together but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes such as, but not limited to, explainable knowledge ingestion, may be employed for engineering prompt input for determining test procedure using various LLMs. For example, the exemplary system 100 and the associated computing device 102 may determine test procedures using LLMs by the processes discussed herein. In particular, as will be appreciated by those of ordinary skill in the art, control logic and/or automated routines for performing the techniques and steps described herein may be implemented by the system 100 and the associated computing device 102 either by hardware, software, or combinations of hardware and software. For example, suitable code may be accessed and executed by the one or more processors 104 on the system 100 to perform some or all of the techniques described herein. Similarly, application specific integrated circuits (ASICs) configured to perform some, or all of the processes described herein may be included in the one or more processors on the system 100.

Figure 3:
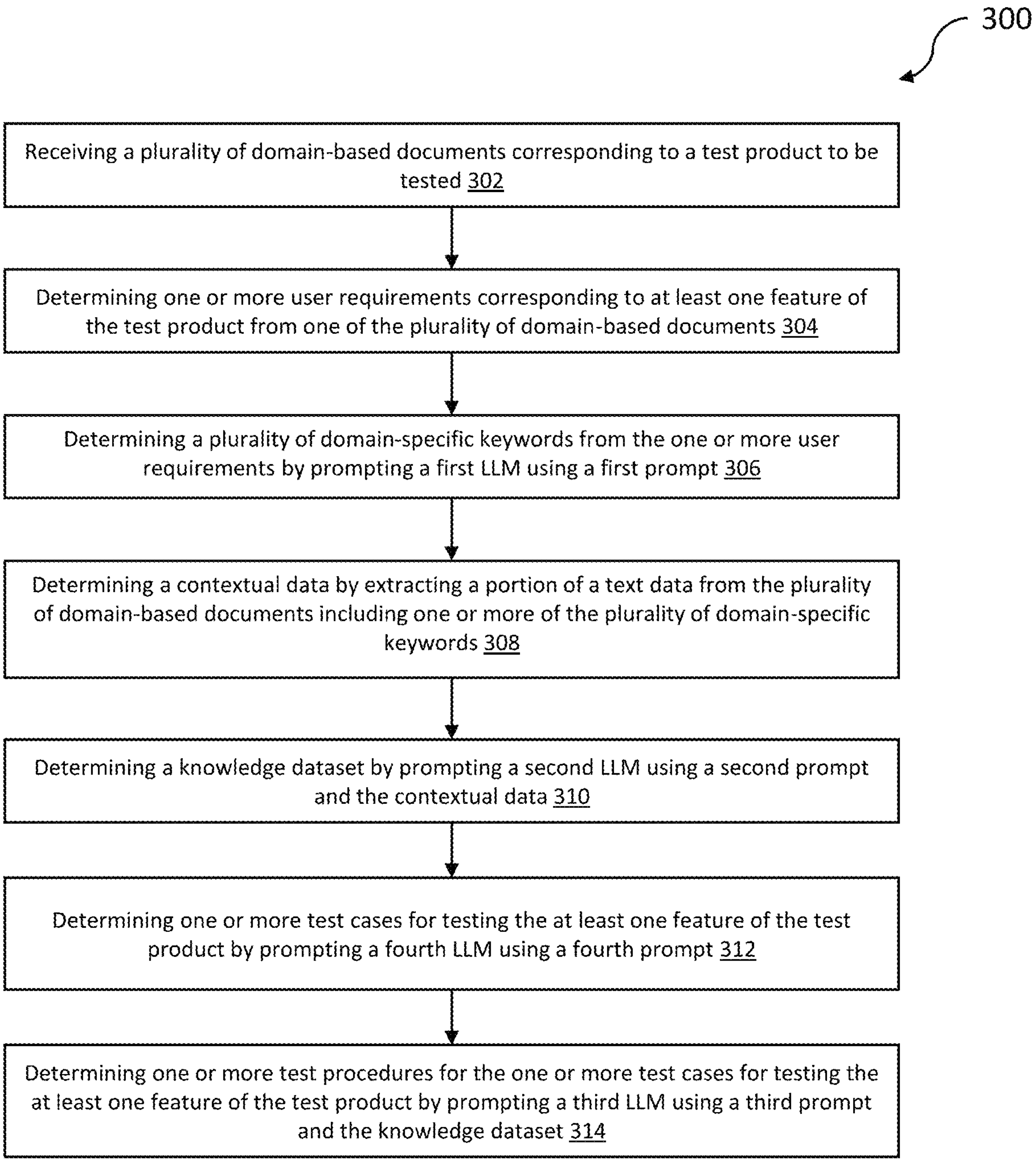
FIG. 3 illustrates a flow diagram of a method of determining test procedures using large language models, in accordance with an embodiment of present disclosure.

Referring now to FIG. 3, a flow diagram of a method of determining test procedures using large language models, in accordance with an embodiment of present disclosure. In an embodiment, method 300 may include a plurality of steps that may be performed by the processor 104 to determine test procedures.

FIG. 3 is explained in conjunction with FIGS. 1 and 2. Each step of the method 300 may be executed by various modules of the computing device 102. At step 302, a plurality of domain-based documents may be received corresponding to a test product to be tested. Further at step 304, one or more user requirements may be determined corresponding to at least one feature of the test product from one of the plurality of domain-based documents. In an embodiment, the plurality of domain-based documents may include a documents including one or more user requirements. Further at step 306, a plurality of domain-specific keywords may be determined from the one or more user requirements by prompting a first LLM using a first prompt. In an embodiment, the first prompt may be engineered to prompt the first LLM to output the plurality of domain-specific keywords by determining a set of nouns based on the one or more user requirements corresponding to the test product to be tested.

Further at step 308, contextual data may be determined by extracting a portion of text data from the plurality of domain-based documents. In an embodiment, the portion of the text data may include one or more of the plurality of domain-specific keywords. Further, in an embodiment, the contextual data may be determined based on determination of a positional relation between each of the plurality of domain-specific keywords with the text data from the plurality of domain-based documents. In an embodiment, the positional relation may be determined based on a lookup of each of the plurality of domain-specific keywords in the text data of the plurality of domain-specific documents. In an embodiment, the contextual data may be determined by extracting the portion of the text data from the plurality of domain-based documents including one or more of the plurality of domain-specific keywords.

Further at step 310, a knowledge dataset may be determined by prompting a second LLM using a second prompt and the contextual data. In an embodiment, the knowledge dataset may include a set of questions and a set of answers to each of the set of questions based on the contextual data and the text data of the plurality of domain-based documents. In an embodiment, the second prompt may be engineered to prompt the second LLM to list the set of questions and the set of answers to each of the set of questions based on the contextual data and the text data of the plurality of domain-based documents.

Further at step 312, one or more test cases may be determined for testing the at least one feature of the test product by prompting a fourth LLM using a fourth prompt. In an embodiment, the fourth prompt may be engineered to prompt the fourth LLM to list the one or more test cases corresponding to the one or more user requirements.

Further at step 314, one or more test procedures may be determined for the one or more test cases for testing the at least one feature of the test product by prompting a third LLM using a third prompt and the knowledge dataset. In an embodiment, each of the one or more test procedures may include at least one pre-condition, a set action steps to be performed for testing the test product, and at least one expected outcome for the at least one pre-condition. In an embodiment, the third prompt may include the one or more test cases for testing the at least one feature of the test product. In an embodiment, the third prompt may be determined as an output generated by the fourth LLM queried using the fourth prompt. In an embodiment, the third prompt may be engineered to output the one or more test procedures for the one or more test cases based on the knowledge dataset and the one or more user requirements.

In an embodiment, challenges for determining test procedures using LLMs for generating consistent codes may include but are not limited to the primary challenge is providing an LLM with domain knowledge to feed it with external or domain-specific knowledge. Conventionally, this was done by using Retrieval Augmented Generation (RAG), or by fine-tuning the entire model which has its own set of difficulties. Large-scale applications may find fine-tuning problematic due to the substantial computing challenges involved. Conversely, using RAG necessitates sending structural data to the LLMs in an efficient manner so that they can understand what is being taught. But in real-world situations, the data is frequently large and disorganized. As a result, chunking techniques-which split documents into smaller chunks for prediction-are mostly used by RAG. However, this method presents a risk of factual loss and inaccuracy, which could result in inaccurate predictions.

Thus, the disclosed method and system tries to overcome the technical problem of determining test procedures through a method and system of determining test procedures using Large Language Models against such challenges. In an embodiment, advantages of the disclosed method and system may include but is not limited to the substantial reduction in hallucination, which refers to the generation of inaccurate or fictional information by the model. In determining test procedures using Large Language Models (LLMs), the proposed method and system ensures that the generated test cases are accurate, reliable, and aligned with the actual requirements of the domain. Furthermore, the approach focuses on extracting and condensing only the relevant knowledge needed for a specific query. This targeted extraction of pertinent information helps streamline the data input to the LLM, eliminating unnecessary details and noise. By condensing the vast knowledge data to include only what is relevant, the proposed method enhances the model's efficiency and effectiveness in generating precise test procedures. Additionally, the approach tackles the challenge of dealing with voluminous and unstructured real-world data.

As will be appreciated by those skilled in the art, the techniques described in the various embodiments discussed above are not routine, or conventional, or well-understood in the art. The techniques discussed above provide for determining test procedures using Large Language Models.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps bring an improvement in the functioning of the device itself as the claimed steps provide a technical solution to a technical problem.

The specification has described method and system for determining test procedures using Large Language Models (LLMs). The illustrated steps are set out to explain the exemplary embodiments shown, and it should be anticipated that ongoing technological development will change the manner in which particular functions are performed. These examples are presented herein for purpose of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

It is intended that the disclosure and examples be considered as exemplary only, with a true scope of disclosed embodiments being indicated by the following claims.

What is claimed is:

1. A method of determining test procedures using large language models (LLMs), the method comprising:

receiving, by a processor, a plurality of domain-based documents corresponding to a test product to be tested;

determining, by the processor, one or more user requirements corresponding to at least one feature of the test product from one of the plurality of domain-based documents;

determining, by the processor, a plurality of domain-specific keywords from the one or more user requirements by prompting a first LLM based on a first prompt;

determining, by the processor, contextual data by extracting a portion of text data from the plurality of domain-based documents, wherein the portion of text data comprises one or more of the plurality of domain-specific keywords;

determining, by the processor, a knowledge dataset by prompting a second LLM based on a second prompt and the contextual data, wherein the knowledge dataset comprises a set of questions and a set of answers to each of the set of questions based on the contextual data and the text data of the plurality of domain-based documents, and wherein the second prompt is engineered to prompt the second LLM to list the set of questions and the set of answers to each of the set of questions based on the contextual data and the text data of the plurality of domain-based documents; and determining, by the processor, one or more test procedures for one or more test cases for testing the at least one feature of the test product by prompting a third LLM based on a third prompt and the knowledge dataset, wherein the third prompt comprises the one or more test cases for testing the at least one feature of the test product.

2. The method of claim 1, wherein the third prompt is determined as an output generated by a fourth LLM queried based on a fourth prompt, wherein the third prompt is engineered to output the one or more test procedures for the one or more test cases based on the knowledge dataset and the one or more user requirements, and wherein the third prompt is engineered to prompt the third LLM to output the one or more test procedures.

3. The method of claim 2, wherein each of the one or more test procedures comprises at least one pre-condition, a set action steps to be performed for testing the test product, and at least one expected outcome for the at least one pre-condition.

4. The method of claim 2, wherein the fourth prompt is engineered to prompt the fourth LLM to list the one or more test cases corresponding to the one or more user requirements.

5. The method of claim 1, wherein the contextual data is determined based on determination of a positional relation between each of the plurality of domain-specific keywords with the text data, and wherein the positional relation is determined based on a lookup of each of the plurality of domain-specific keywords in the text data of the plurality of domain-based documents.

6. The method of claim 1, wherein the first prompt is engineered to prompt the first LLM to output the plurality of domain-specific keywords by determining a set of nouns based on the one or more user requirements corresponding to the test product to be tested.

7. A system of determining test procedures using large language models (LLMs), comprising:

a processor; and a memory communicably coupled to the processor, wherein the memory stores processor-executable instructions, which, on execution, cause the processor to:

receive a plurality of domain-based documents corresponding to a test product to be tested;

determine one or more user requirements corresponding to at least one feature of the test product from one of the plurality of domain-based documents;

determine a plurality of domain-specific keywords from the one or more user requirements by prompting a first LLM based on a first prompt;

determine a contextual data by extracting a portion of a text data from the plurality of domain-based documents, wherein the portion of the text data comprises one or more of the plurality of domain-specific keywords;

determine a knowledge dataset by prompting a second LLM based on a second prompt and the contextual data, wherein the knowledge dataset comprises a set of questions and a set of answers to each of the set of questions based on the contextual data and the text data of the plurality of domain-based documents, and wherein the second prompt is engineered to prompt the second LLM to list the set of questions and the set of answers to each of the set of questions based on the contextual data and the text data of the plurality of domain-based documents; and determine one or more test procedures for one or more test cases for testing the at least one feature of the test product by prompting a third LLM based on a third prompt and the knowledge dataset, wherein the third prompt comprises the one or more test cases for testing the at least one feature of the test product.

8. The system of claim 7, wherein the third prompt is determined as an output generated by a fourth LLM queried based on a fourth prompt, wherein the fourth prompt is engineered to output the one or more test procedures for the one or more test cases based on the knowledge dataset and the one or more user requirements, and wherein the third prompt is engineered to prompt the third LLM to output the one or more test procedures.

9. The system of claim 8, wherein each of the one or more test procedures comprises at least one pre-condition, a set action steps to be performed for testing the test product, and at least one expected outcome for the at least one pre-condition.

10. The system of claim 8, wherein the fourth prompt is engineered to prompt the fourth LLM to list the one or more test cases corresponding to the one or more user requirements.

11. The system of claim 7, wherein the contextual data is determined based on determination of a positional relation between each of each of the plurality of domain-specific keywords with the text data, and wherein the positional relation is determined based on a lookup of each of the plurality of domain-specific keywords in the text data of the plurality of domain-based documents.

12. The system of claim 7, wherein the first prompt is engineered to prompt the first LLM to output the plurality of domain-specific keywords by determining a set of nouns based on the one or more user requirements corresponding to the test product to be tested.

13. A non-transitory computer-readable medium storing computer-executable instructions for determining test procedures using large language models (LLMs), the computer-executable instructions configured for:

receiving a plurality of domain-based documents corresponding to a test product to be tested;

determining one or more user requirements corresponding to at least one feature of the test product from one of the plurality of domain-based documents;

determining a plurality of domain-specific keywords from the one or more user requirements by prompting a first LLM based on a first prompt;

determining contextual data by extracting a portion of text data from the plurality of domain-based documents, wherein the portion of text data comprises one or more of the plurality of domain-specific keywords;

determining a knowledge dataset by prompting a second LLM based on a second prompt and the contextual data, wherein the knowledge dataset comprises a set of questions and a set of answers to each of the set of questions based on the contextual data and the text data of the plurality of domain-based documents, and wherein the second prompt is engineered to prompt the second LLM to list the set of questions and the set of answers to each of the set of questions based on the contextual data and the text data of the plurality of domain-based documents; and determining one or more test procedures for one or more test cases for testing the at least one feature of the test product by prompting a third LLM based on a third prompt and the knowledge dataset, wherein the third prompt comprises the one or more test cases for testing the at least one feature of the test product.

14. The non-transitory computer-readable medium of claim 13, wherein the third prompt is determined as an output generated by a fourth LLM queried based on a fourth prompt, wherein the third prompt is engineered to output the one or more test procedures for the one or more test cases based on the knowledge dataset and the one or more user requirements, and wherein the third prompt is engineered to prompt the third LLM to output the one or more test procedures.

15. The non-transitory computer-readable medium of claim 14, wherein each of the one or more test procedures comprises at least one pre-condition, a set action steps to be performed for testing the test product, and at least one expected outcome for the at least one pre-condition.

16. The non-transitory computer-readable medium of claim 14, wherein the fourth prompt is engineered to prompt the fourth LLM to list the one or more test cases corresponding to the one or more user requirements.

17. The non-transitory computer-readable medium of claim 13, wherein the contextual data is determined based on determination of a positional relation between each of the plurality of domain-specific keywords with the text data, and wherein the positional relation is determined based on a lookup of each of the plurality of domain-specific keywords in the text data of the plurality of domain-based documents.

18. The non-transitory computer-readable medium of claim 13, wherein the first prompt is engineered to prompt the first LLM to output the plurality of domain-specific keywords by determining a set of nouns based on the one or more user requirements corresponding to the test product to be tested.

* * * * *